(12) United States Patent
Ting et al.

(10) Patent No.: US 8,792,064 B2
(45) Date of Patent: *Jul. 29, 2014

(54) PIXEL ARRAY, LIQUID CRYSTAL DISPLAY PANEL, AND ELECTRO-OPTICAL APPARATUS

(75) Inventors: Tien-Lun Ting, Taichung (TW);
Chieh-Wei Chen, Taichung (TW);
Chih-Haw Wang, New Taipei (TW);
Chung-Yi Chiu, Tainan (TW);
Wen-Hao Hsu, Hsinchu County (TW);
Jenn-Jia Su, Chiayi County (TW)

(73) Assignee: Au Optronics Corporation, Hsinchu (TW)

( * ) Notice: Subject to any disclaimer, the term of this patent is extended or adjusted under 35 U.S.C. 154(b) by 495 days.

This patent is subject to a terminal disclaimer.

(21) Appl. No.: 13/180,558

(22) Filed: Jul. 12, 2011

(65) Prior Publication Data
US 2011/0267567 A1 Nov. 3, 2011

Related U.S. Application Data

(63) Continuation-in-part of application No. 12/503,845, filed on Jul. 16, 2009, now Pat. No. 8,004,626.

(30) Foreign Application Priority Data

Apr. 2, 2009 (TW) ............................... 98111072 A

(51) Int. Cl.
*G02F 1/136* (2006.01)
(52) U.S. Cl.
USPC .................. 349/48; 349/38; 349/39; 349/144
(58) Field of Classification Search
CPC .............. G02F 1/13624; G02F 2001/134345; G02F 1/136213

USPC ........................................................... 349/48
See application file for complete search history.

(56) References Cited

U.S. PATENT DOCUMENTS

| 7,206,048 | B2 | 4/2007 | Song |
| 8,004,626 | B2 * | 8/2011 | Ting et al. ..................... 349/48 |
| 2008/0024689 | A1 | 1/2008 | Ahn |

FOREIGN PATENT DOCUMENTS

TW 200835991 9/2008

OTHER PUBLICATIONS

"Office Action of Taiwan Counterpart Application", issued on Aug. 30, 2012, p. 1-p. 4.

* cited by examiner

*Primary Examiner* — Richard Kim
(74) *Attorney, Agent, or Firm* — Jianq Chyun IP Office

(57) ABSTRACT

A pixel array including first scan lines, second scan lines, data lines, and sub-pixels is provided. Each sub-pixel includes a first switch, a second switch, a first pixel electrode electrically connected to the first switch, a second pixel electrode electrically connected to the second switch, a third switch, and common lines connected with each other and disposed under the first and the second pixel electrode. The first and the second switch are electrically connected to the same first scan line and data line. The first scan line is located between the first and second pixel electrode. The third switch is electrically connected to the second scan line and the first pixel electrode and has a floating terminal. The floating terminal is capacitively coupled to the common line under the second pixel electrode to form a capacitor.

16 Claims, 24 Drawing Sheets

PIXEL ARRAY, LIQUID CRYSTAL DISPLAY PANEL, AND ELECTRO-OPTICAL APPARATUS

CROSS-REFERENCE TO RELATED APPLICATION

This application is a continuation-in-part of and claims the priority benefit of a prior application Ser. No. 12/503,845, filed Jul. 16, 2009, now allowed. The prior application Ser. No. 12/503,845 claims the priority benefit of Taiwan application serial no. 98111072, filed on Apr. 2, 2009. The entirety of each of the above-mentioned patent applications is hereby incorporated by reference herein and made a part of specification.

BACKGROUND OF THE INVENTION

1. Field of the Invention

The present invention generally relates to a pixel array, and more particularly, to a pixel array with good display quality.

2. Description of Related Art

In recent years, the size of liquid crystal display (LCD) has been increased constantly. As a result, techniques for resolving the viewing angle problem in large-sized LCDs have been improved constantly. Multi-domain vertical alignment (MVA) LCD panel and advanced MVA (AMVA) LCD panel are two major wide viewing angle techniques among all LCD techniques. Since the AMVA LCD panel can effectively resolve the color washout problem in the MVA LCD panel, the AMVA LCD panel provides a better display quality compared to the MVA LCD panel.

FIG. 1 is an equivalent circuit diagram of a pixel array. FIG. 2 is a diagram of a single sub-pixel in FIG. 1. Referring to FIG. 1 and FIG. 2, the pixel array 200 includes a plurality of sub-pixels P2, and each of the sub-pixels P2 includes a first thin film transistor TFT1, a second thin film transistor TFT2, a third thin film transistor TFT3, a first pixel electrode ITO1 electrically connected to the first thin film transistor TFT1, and a second pixel electrode ITO2 electrically connected to the second thin film transistor TFT2. The first pixel electrode ITO1 is capacitively coupled to a common line COM1 on a TFT array substrate having the pixel array 200 to form a first storage capacitor Cs1, and the first pixel electrode ITO1 is capacitively coupled to a common electrode on an opposite substrate (for example, a color filter substrate) to form a first liquid crystal capacitor CLC1. Similarly, the second pixel electrode ITO2 is capacitively coupled to a common line COM2 on the TFT array substrate to form a second storage capacitor Cs2, and the second pixel electrode ITO2 is capacitively coupled to the common electrode on the opposite substrate (for example, a color filter substrate) to form a second liquid crystal capacitor CLC2.

As shown in FIG. 1 and FIG. 2, in the sub-pixel P2 electrically connected to the scan line SL(n−1), the gate or namely gate electrode of the first thin film transistor TFT1 and the gate or namely gate electrode of the second thin film transistor TFT2 are both electrically connected to the scan line SL(n−1), and the gate of the third thin film transistor TFT3 is electrically connected to the next scan line SL(n). Besides, the source or namely source electrode of the third thin film transistor TFT3 is electrically connected to the second pixel electrode ITO2, the drain or namely drain electrode D3 of the third thin film transistor TFT3 is capacitively coupled to the first pixel electrode ITO1 to form a first capacitor CcA, and the drain D3 of the third thin film transistor TFT3 is capacitively coupled to the common line COM1 under the first pixel electrode ITO1 to form a second capacitor CcB. When a high voltage is supplied to the scan line SL(n−1), image data can be recoded into the sub-pixel connected to the scan line SL(n−1) through the data lines DL(n−1) and DL(n). Herein, the first pixel electrode ITO1 and the second pixel electrode ITO2 have the same voltage level. When a high voltage is supplied to the scan line SL(n), the first capacitor CcA and the second capacitor CcB make the voltage of the first pixel electrode ITO1 different from the voltage of the second pixel electrode ITO2.

Because the drain of the second thin film transistor TFT2 extends across the first pixel electrode ITO1 and connected to the second pixel electrode ITO2, a parasitic capacitance Cx1 is generated between the drain D2 of the second thin film transistor TFT2 and the first pixel electrode ITO1. In addition, since the drain D3 of the third thin film transistor TFT3 extends across the second pixel electrode ITO2, a parasitic capacitance Cx2 is generated between the drain D3 of the third thin film transistor TFT3 and the second pixel electrode ITO2. The parasitic capacitances Cx1 and Cx2 reduce the voltage difference between the first pixel electrode ITO1 and the second pixel electrode ITO2. As a result, the problem of color washout cannot be effectively resolved. Thereby, the affection of the parasitic capacitances Cx1 and Cx2 in the sub-pixel P2 to the display quality has to be eliminated.

SUMMARY OF THE INVENTION

Accordingly, the present invention is directed to a pixel array, a liquid crystal display (LCD) panel, and an electro-optical apparatus with good display quality.

The present invention provides a pixel array including a plurality of first scan lines, a plurality of second scan lines, a plurality of data lines, and a plurality of sub-pixels. Each of the second scan lines is located between two adjacent first scan lines, and the data lines are substantially intersected with the first scan lines and the second scan lines. Each of the sub-pixels is electrically connected to one of the first scan lines, one of the second scan lines, and one of the data lines. Each of the sub-pixels includes a first switch, a second switch, a first pixel electrode, a second pixel electrode, a third switch, and a plurality of common lines connected with each other, wherein the first switch and the second switch are electrically connected to the same first scan line and the same data line, the first pixel electrode is electrically connected to the first switch, the second pixel electrode is electrically connected to the second switch, one of the first scan lines is located between the first pixel electrode and the second pixel electrode, and the common lines are disposed under the first pixel electrode and the second pixel electrode. Besides, the third switch is electrically connected to the first pixel electrode and one of the second scan lines. The third switch has a floating terminal, wherein the floating terminal is capacitively coupled to the common line under the second pixel electrode to form a capacitor.

According to an embodiment of the present invention, the extension direction of the first scan lines is substantially parallel to the extension direction of the second scan lines.

According to an embodiment of the present invention, the sub-pixels are arranged into a plurality of rows, and the sub-pixels in the same row are electrically connected to the same first scan line and the same second scan line.

According to an embodiment of the present invention, the first scan line and the second scan line electrically connected to the sub-pixels in the same row are electrically insulated from each other.

According to an embodiment of the present invention, the sub-pixels are arranged into a plurality of rows, and the second scan line electrically connected to the sub-pixels in the $n^{th}$ row and the first scan line electrically connected to the sub-pixels in the $(n+1)^{th}$ row are electrically connected to each other.

According to an embodiment of the present invention, each of the second scan lines is located between the first pixel electrode and the second pixel electrode.

According to an embodiment of the present invention, the second pixel electrode is located between the first scan line and the second scan line.

According to an embodiment of the present invention, each of the first switches is a first thin film transistor (TFT), wherein the first TFT has a first gate electrically connected to one of the first scan lines, a first source electrically connected to one of the data lines, and a first drain electrically connected to the first pixel electrode.

According to an embodiment of the present invention, each of the second switches is a second TFT, wherein the second TFT has a second gate electrically connected to one of the first scan lines, a second source electrically connected to one of the data lines, and a second drain electrically connected to the second pixel electrode.

According to an embodiment of the present invention, each of the third switches is a third TFT, wherein the third TFT has a third gate electrically connected to one of the second scan lines, a third source electrically connected to the first pixel electrode, and the floating terminal.

According to an embodiment of the present invention, the third source is directly connected to the first pixel electrode.

According to an embodiment of the present invention, the third source is directly connected to the first drain, and the third source is electrically connected to the first pixel electrode through the first drain.

According to an embodiment of the present invention, the floating terminal is located under the second pixel electrode.

According to an embodiment of the present invention, the line width of each of the first scan lines is substantially greater than the line width of each of the second scan lines located in the same sub-pixel.

The present invention also provides a polymer stabilized alignment liquid crystal display (PSA-LCD) panel including a first substrate, a second substrate, two polymer stabilized alignment layers, and a liquid crystal layer. The first substrate has the aforementioned pixel array. The second substrate is disposed above the first substrate. The two polymer stabilized alignment layers are respectively disposed on the first substrate and the second substrate. The liquid crystal layer is disposed between the two polymer stabilized alignment layers.

The present invention further provides an electro-optical apparatus including the aforementioned pixel array or the aforementioned PSA-LCD panel.

As described above, in the present invention, the first scan line in each sub-pixel is disposed between the first pixel electrode and the second pixel electrode. Accordingly, the pixel array in the present invention has lower parasitic capacitance and accordingly provides a better image quality.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 3B' is a cross-sectional view of the pixel array in FIG. 3B along line A-A'.

FIG. 5B' is a cross-sectional view of the pixel array in FIG. 5B along line B-B'.

DESCRIPTION OF THE EMBODIMENTS

Figure 1:
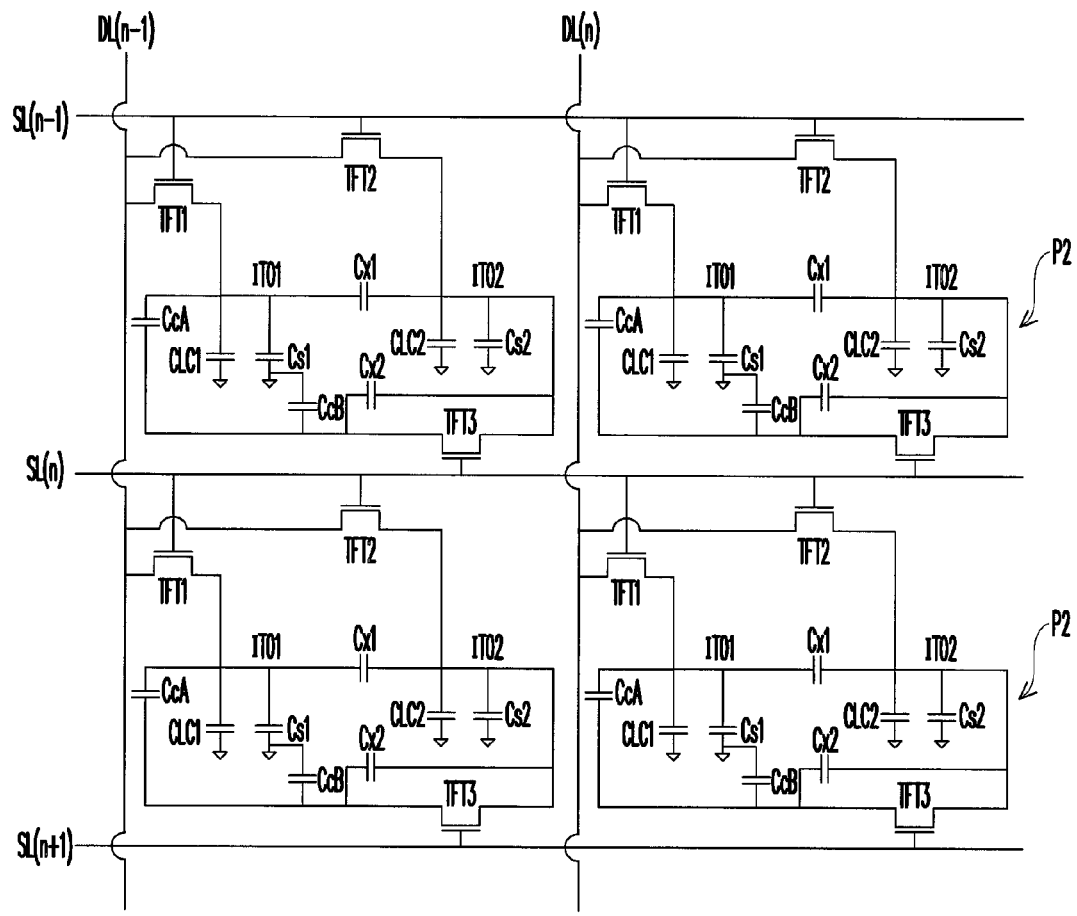
FIG. 1 is an equivalent circuit diagram of a pixel array.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 3A:
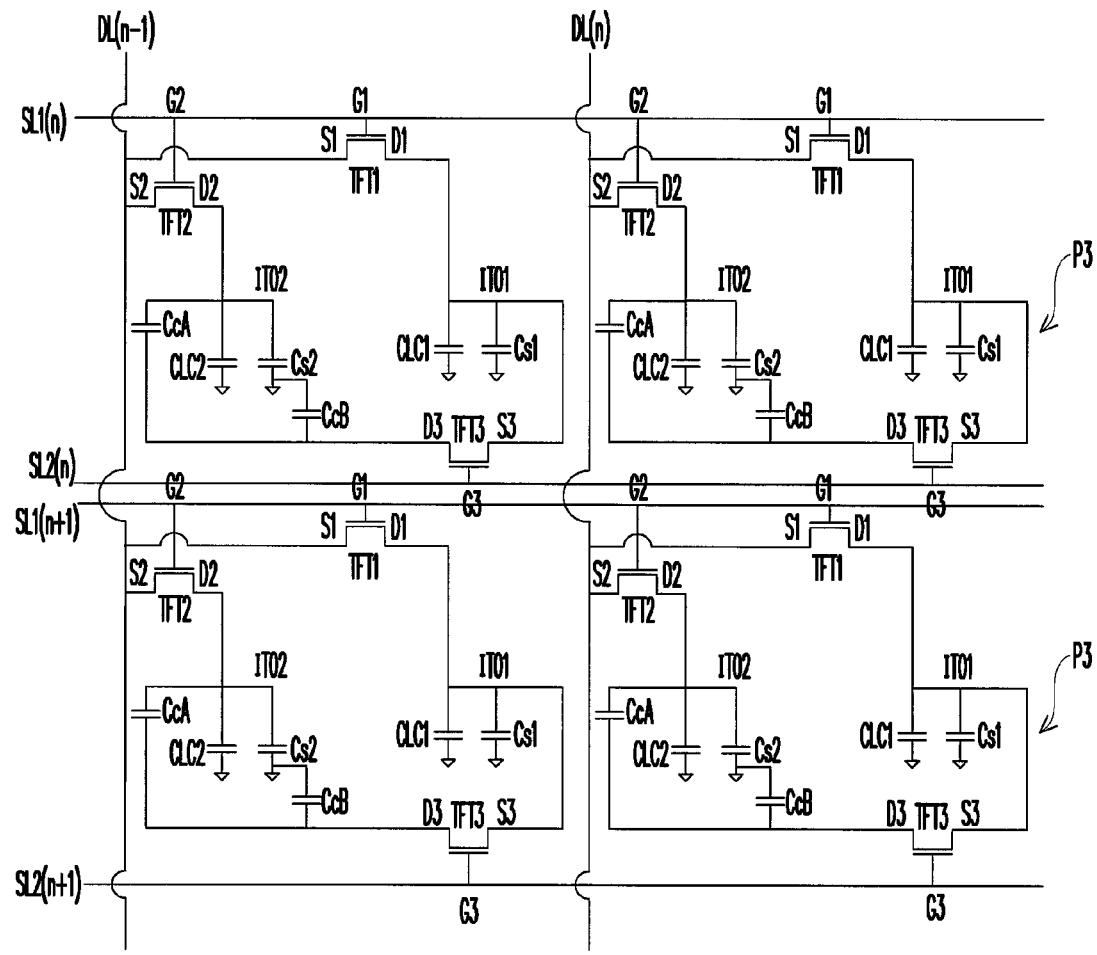
FIG. 3A is an equivalent circuit diagram of a pixel array according to a first embodiment of the present invention.
Figure 3B:
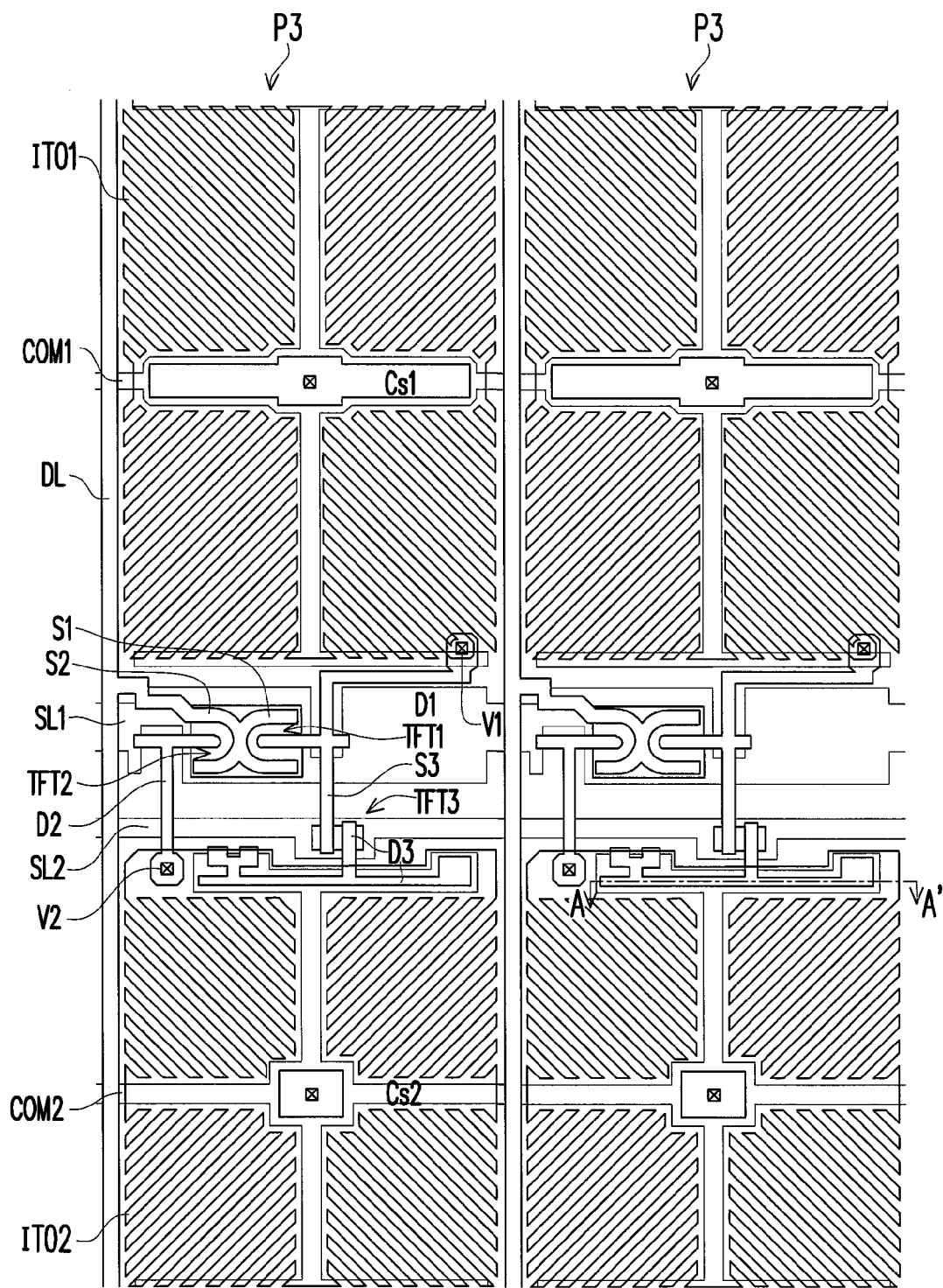
FIG. 3B is a diagram of a pixel array according to the first embodiment of the present invention.
Figure 3B:
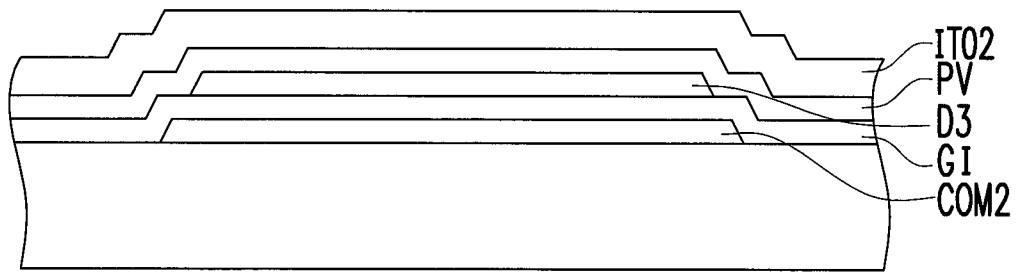

FIG. 3A is an equivalent circuit diagram of a pixel array according to the first embodiment of the present invention, FIG. 3B is a diagram of a pixel array according to the first embodiment of the present invention, and FIG. 3B' is a cross-sectional view of the pixel array in FIG. 3B along line A-A'. Referring to FIG. 3A and FIG. 3B, the pixel array 300 of the present embodiment includes a plurality of first scan lines SL1, a plurality of second scan lines SL2, a plurality of data lines DL, and a plurality of sub-pixels P3. The first scan lines SL1 include first scan lines SL1(1)~SL1($n$+1), the second scan lines SL2 include second scan lines SL2(1)~SL2($n$+1), and the data lines DL include data lines DL(1)~DL(n). Only some of the first scan lines SL1, some of the second scan lines SL2, and some of the data lines DL are illustrated in FIG. 3A and FIG. 3B.

Each of the second scan lines SL2 is located between adjacent two first scan lines SL1, and the data lines DL are substantially intersected with the first scan lines SL1 and the second scan lines SL2. Each of the sub-pixels P3 is electrically connected to one of the first scan lines SL1, one of the second scan lines SL2, and one of the data lines DL. Each of the sub-pixels P3 includes a first switch TFT1, a second switch TFT2, a first pixel electrode ITO1, a second pixel electrode ITO2, and a third switch TFT3. The first switch TFT1 and the second switch TFT2 are electrically connected to the same first scan line SL1 and the same data line DL. The first pixel electrode ITO1 is electrically connected to the first switch TFT1, and the second pixel electrode ITO2 is electrically connected to the second switch TFT2. The first scan line SL1 is located between the first pixel electrode ITO1 and the second pixel electrode ITO2. Besides, the third switch TFT3 is electrically connected to the second scan line SL2 and the first pixel electrode ITO1. The third switch TFT3 has a floating terminal D3, wherein the floating terminal D3 is capacitively coupled to the second pixel electrode ITO2 to form a first capacitor CcA and capacitively coupled to a common line COM2 under the second pixel electrode ITO2 to form a second capacitor CcB. In an exemplary embodiment of the present invention, the floating terminal D3 is extended under the second pixel electrode ITO2 and located above the common line COM2, as shown in FIG. 3B'. In other words, the floating terminal D3 is disposed above the common line COM2, and a gate insulation layer GI is disposed between the floating terminal D3 and the common line COM2. Besides, the second pixel electrode ITO2 is disposed above the floating terminal D3, and a passivation layer PV is disposed between the second pixel electrode ITO2 and the floating terminal D3. Accordingly, the common line COM2, the gate insulation layer GI, the floating terminal D3, the passivation layer PV, and the second pixel electrode ITO2 form a stack structure.

Since pluralities of switches (i.e., the first switch and the second switch) are connected to the first scan line SL1, in order to balance resistance-capacitance (RC) delay of the first scan line SL1 and the second scan line SL2, the line width of each first scan lines SL1 is made greater than that of each second scan line SL2. However, in other embodiments of the present invention, the RC delay of the first scan line SL1 may also be reduced by selecting suitable materials.

In the present embodiment, the first pixel electrode ITO1 is capacitively coupled to a common line on a TFT array substrate to form a first storage capacitor Cs1, and the first pixel electrode ITO1 is capacitively coupled to a common electrode on an opposite substrate (for example, a color filter substrate) to form a first liquid crystal capacitor CLC1. Similarly, the second pixel electrode ITO2 is capacitively coupled to the common line on the TFT array substrate to form a second storage capacitor Cs2, and the second pixel electrode ITO2 is capacitively coupled to the common electrode on the opposite substrate (for example, a color filter substrate) to form a second liquid crystal capacitor CLC2. As shown in FIG. 3B, the area of the first pixel electrode ITO1 is greater than the area of the second pixel electrode ITO2. However, the proportion between the areas of the first pixel electrode ITO1 and the second pixel electrode ITO2 is not limited in the present embodiment.

As shown in FIG. 3A, in the present embodiment, the extension direction of the first scan lines SL1 is substantially parallel to the extension direction of the second scan lines SL2. In addition, the sub-pixels P3 are arranged into a plurality of rows, the sub-pixels P3 in the same row are electrically connected to the same first scan line SL1 and the same second scan line SL2, and the first scan line SL1 and the second scan line SL2 electrically connected to the sub-pixels P3 in the same row are electrically insulated from each other.

In the present embodiment, the first scan line SL1 and the second scan line SL2 in each of the sub-pixels P3 are both located between the first pixel electrode ITO1 and the second pixel electrode ITO2. Since the first scan line SL1 and the second scan line SL2 are both located between the first pixel electrode ITO1 and the second pixel electrode ITO2, the first switch TFT1, the second switch TFT2, and the third switch TFT3 are concentrated in the area between the first pixel electrode ITO1 and the second pixel electrode ITO2. Accordingly, the first pixel electrode ITO1 and the second pixel electrode ITO2 are electrically connected to the first switch TFT1, the second switch TFT2, and the third switch TFT3 easily.

As shown in FIG. 3A, in the present embodiment, the first switch TFT1 is a first thin film transistor, and the first thin film transistor has a first gate G1 electrically connected to one of the first scan lines SL1, a first source S1 electrically connected to one of the data lines DL, and a first drain D1 electrically connected to the first pixel electrode ITO1. The second switch TFT2 is a second thin film transistor, and the second thin film transistor has a second gate G2 electrically connected to one of the first scan lines SL1, a second source S2 electrically connected to one of the data lines DL, and a second drain D2 electrically connected to the second pixel electrode ITO2. The third switch TFT3 is a third thin film transistor, and the third thin film transistor has a third gate G3 electrically connected to one of the second scan lines SL2, a third source S3 electrically connected to the first pixel electrode ITO1, and a third drain D3 (i.e., aforementioned floating terminal D3).

Figure 3C:
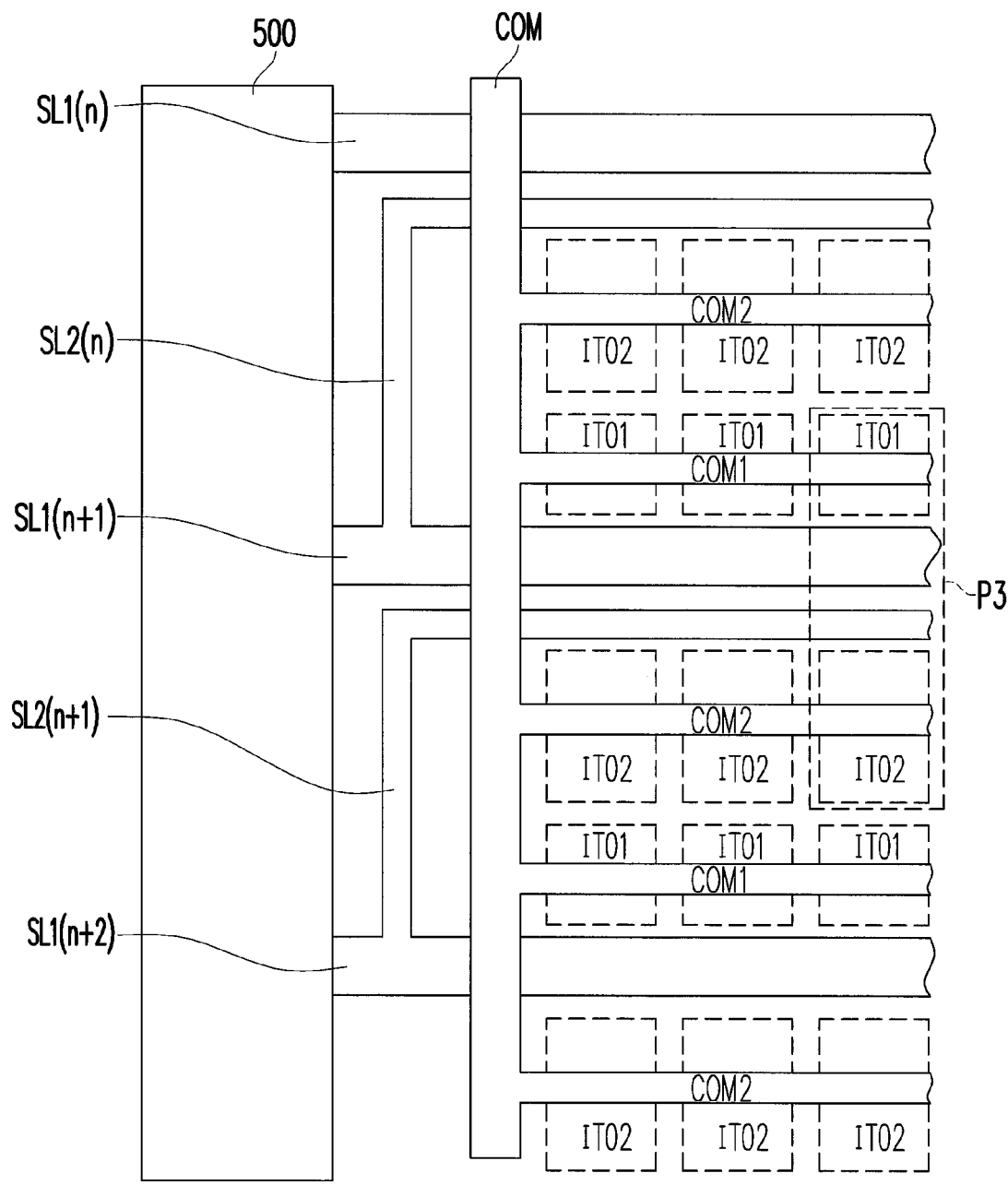
FIG. 3C is a diagram of a pixel array and its peripheral circuit according to the first embodiment of the present invention.

FIG. 3C is a diagram of a pixel array and its peripheral circuit according to the first embodiment of the present invention. Referring to FIG. 3B and FIG. 3C, the pixel array 300 of the present embodiment further includes a plurality of common lines COM (i.e., the common lines COM1 and COM2) connected with each other, and the common lines COM are disposed under the first pixel electrode ITO1 and the second pixel electrode IT02. To be specific, the common line COM1 is extended from the peripheral area to the first pixel electrode ITO1, and the common line COM2 is extended from the peripheral area to under the second pixel electrode IT02.

As shown in FIG. 3C, the sub-pixels P3 in the pixel array 300 are arranged into a plurality of rows, and the second scan line SL2(n) electrically connected to the sub-pixels P3 in the $n^{th}$ row and the first scan line SL1(n+1) electrically connected to the sub-pixels P3 in the $(n+1)^{th}$ row are electrically connected with each other. Similarly, the second scan line SL2(n+1) and the first scan line SL1(n+2) are also electrically connected with each other. Additionally, the first scan lines SL1(n), SL1(n+1), and SL1(n+2) are electrically connected to different output terminals of a gate driving circuit 500.

However, in the present invention, it is not limited to electrically connecting a second scan line to a next first scan line; instead, the first scan lines and the second scan lines may also be electrically connected to different output terminals of the gate driving circuit 500 individually.

Figure 3D:
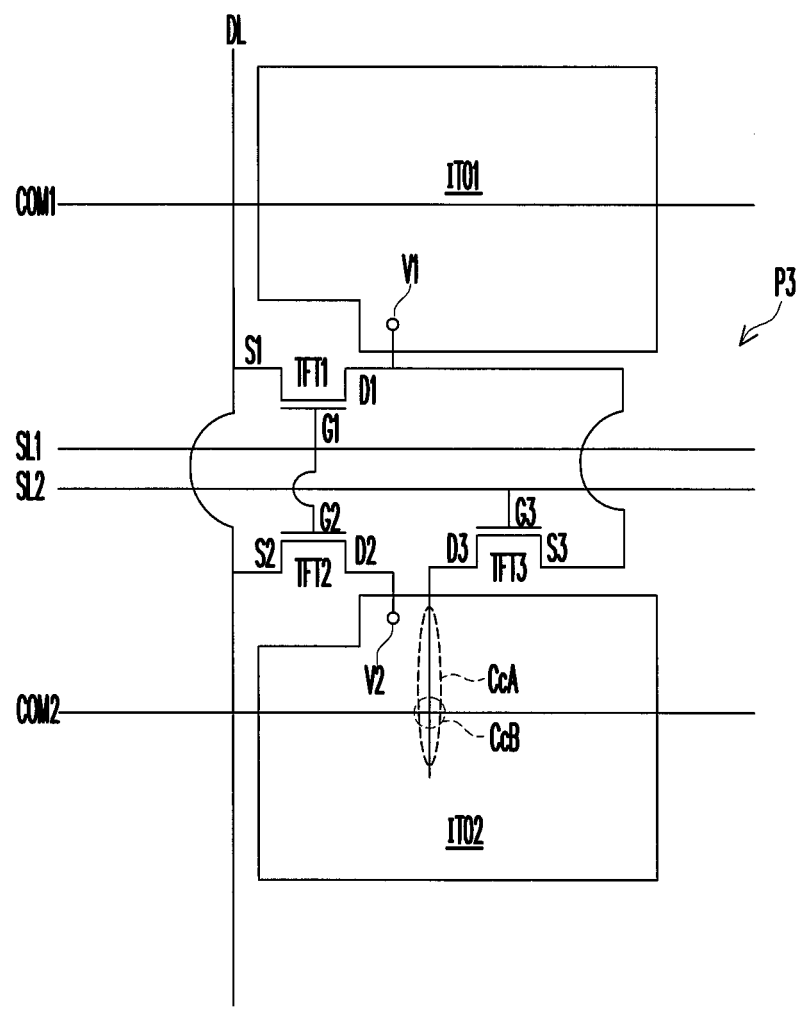
FIG. 3D is a diagram of a single sub-pixel in FIG. 3B.

FIG. 3D is a diagram of a single sub-pixel in FIG. 3B. Referring to FIG. 3B and FIG. 3D, since the first scan line SL1 and the second scan line SL2 in a single sub-pixel P3 are both located between the first pixel electrode ITO1 and the second pixel electrode ITO2, when the second drain D2 of the second thin film transistor TFT2 is electrically connected to the second pixel electrode ITO2, the second drain D2 does not extend across the first pixel electrode ITO1 to generate a parasitic capacitance (i.e., the parasitic capacitance Cx1 in the conventional technique). Besides, when the third drain D3 of the third thin film transistor TFT3 is capacitively coupled to the second pixel electrode ITO2 to form the first capacitor CcA and capacitively coupled to the common line under the second pixel electrode ITO2 to form the second capacitor CcB, the third drain D3 is not capacitively coupled to the first pixel electrode ITO1 to generate a parasitic capacitance. Thus, compared to the conventional technique, the sub-pixels P3 in the present embodiment have less parasitic capacitance.

As shown in FIG. 3D, the third source S3 of the third thin film transistor TFT3 is directly connected to the first drain D1 of the first thin film transistor TFT1, and the third source S3 thereof is electrically connected to the first pixel electrode ITO1 through the first drain D1. In other words, the first drain D1 of the first thin film transistor TFT1 and the third source S3 of the third thin film transistor TFT3 are electrically connected to the first pixel electrode ITO1 through a same contact window V1. Besides, the second drain D2 of the second thin film transistor TFT2 is electrically connected to the second pixel electrode ITO2 through a contact window V2.

Figure 4:
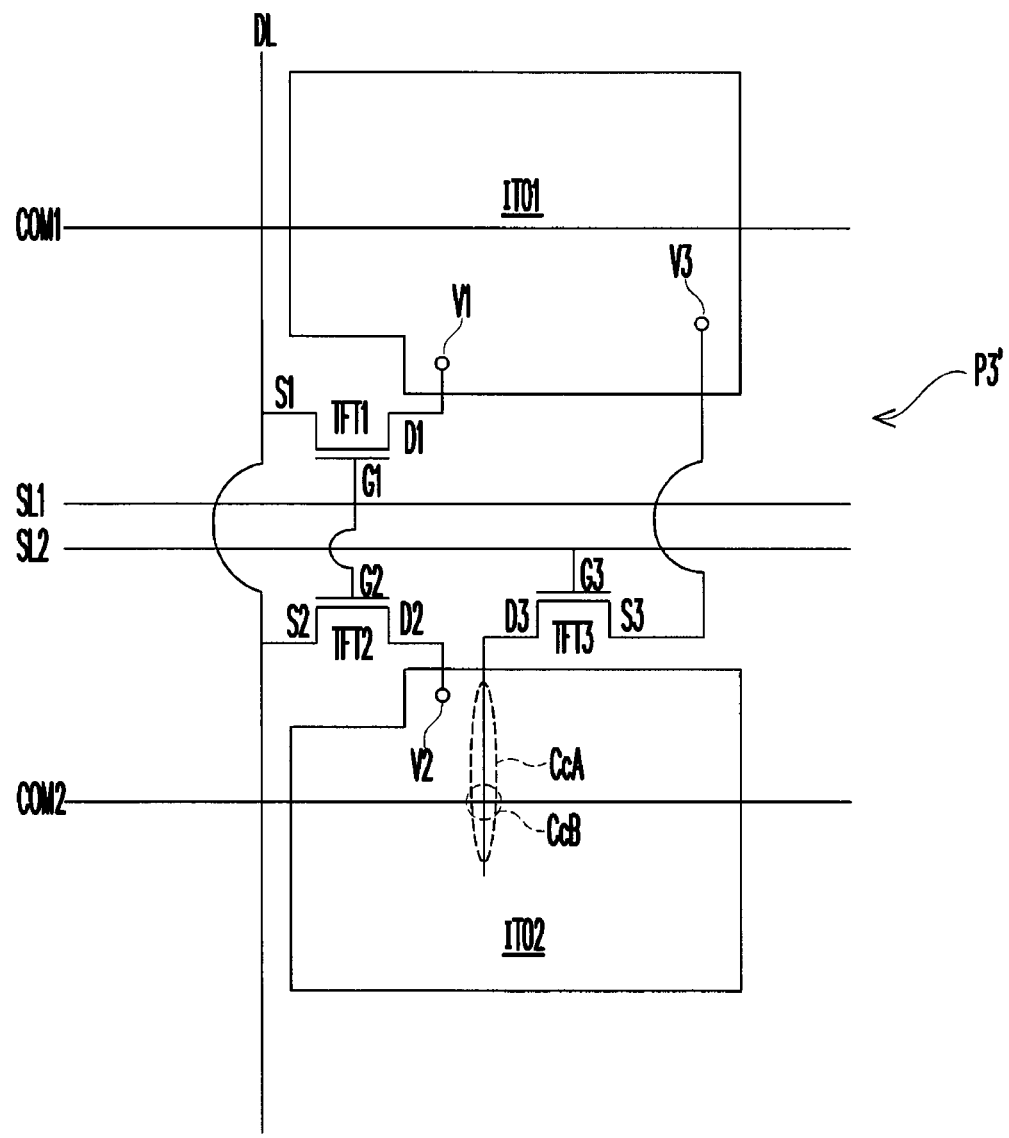
FIG. 4 is a diagram of another single sub-pixel.

FIG. 4 is a diagram of another single sub-pixel. Referring to FIG. 4, in the sub-pixel P3', the third source S3 of the third thin film transistor TFT3 is directly connected to the first pixel electrode ITO1. In other words, the first drain D1 of the first thin film transistor TFT1 and the third source S3 of the third thin film transistor TFT3 are electrically connected to the first pixel electrode ITO1 respectively through the contact windows V1 and V3. Besides, the second drain D2 of the second thin film transistor TFT2 is electrically connected to the second pixel electrode ITO2 through the contact window V2.

As shown in FIG. 3D and FIG. 4, the sub-pixel P3 in FIG. 3D does not have the contact window V3. Thus, the sub-pixel P3 in FIG. 3D has higher aperture ratio.

Second Embodiment

Figure 9A:
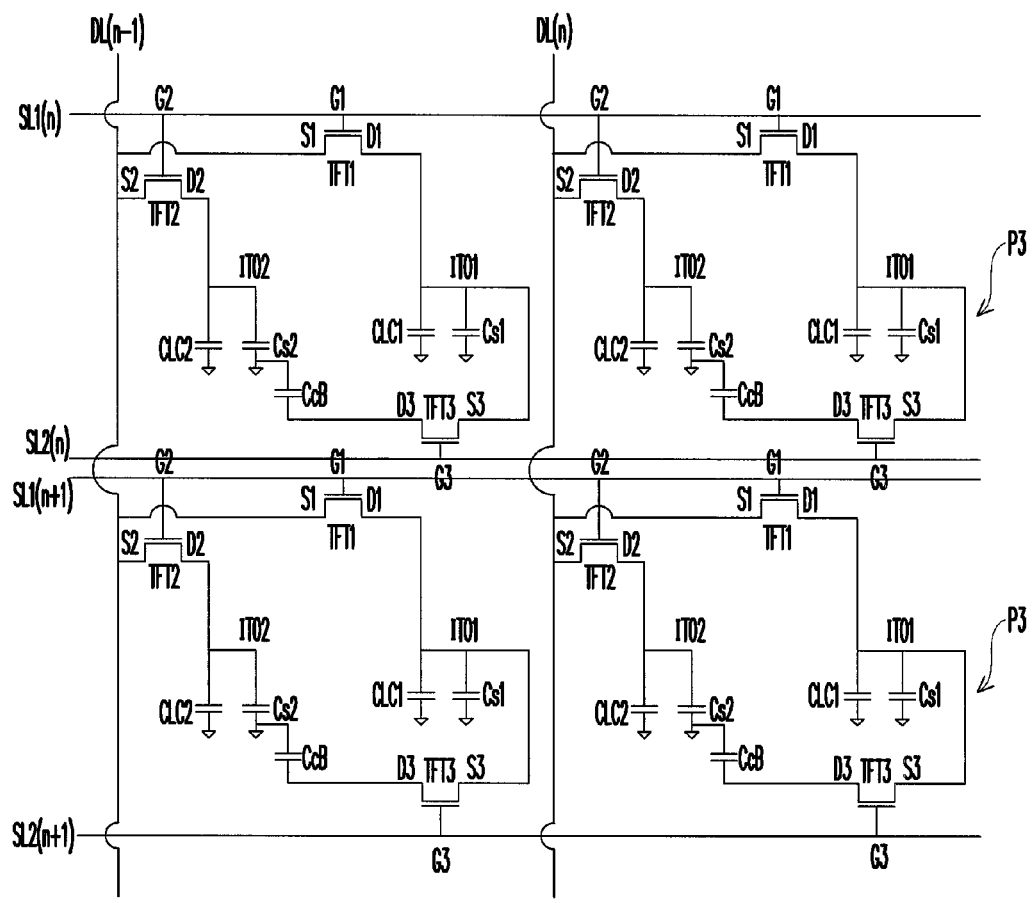
FIG. 9A is an equivalent circuit diagram of a pixel array according to the second embodiment of the present invention.
Figure 9B:
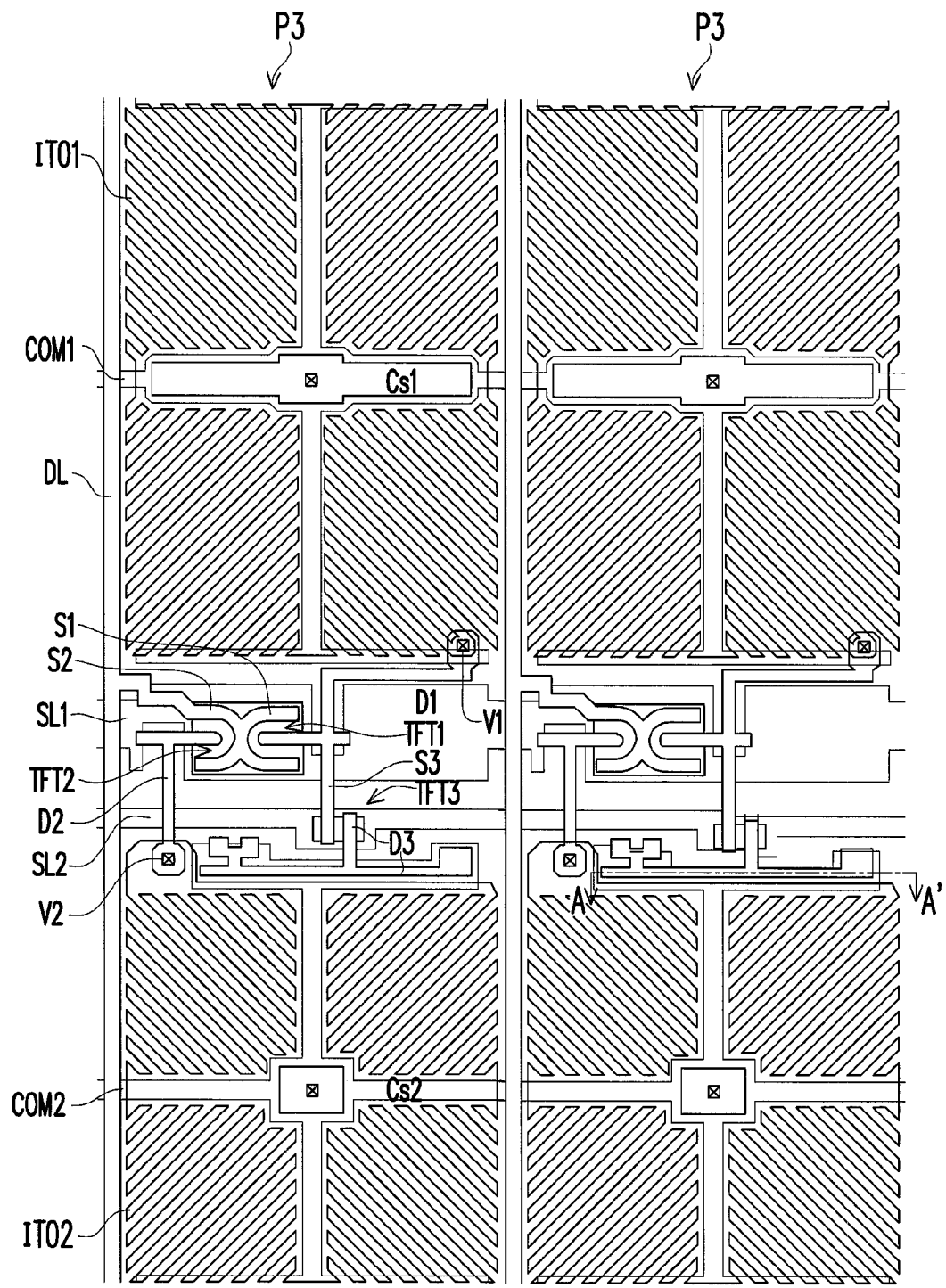
FIG. 9B is a diagram of a pixel array according to the second embodiment of the present invention.
Figure 9C:
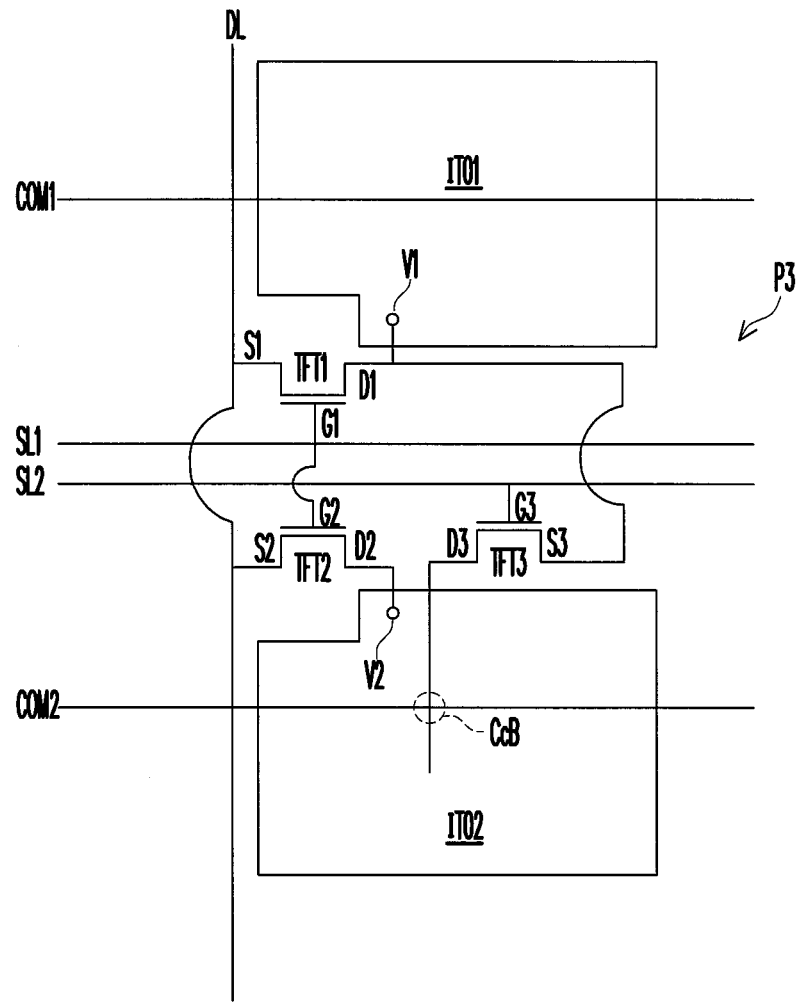
FIG. 9C is a diagram of a single sub-pixel in FIG. 9B.
Figure 9D:
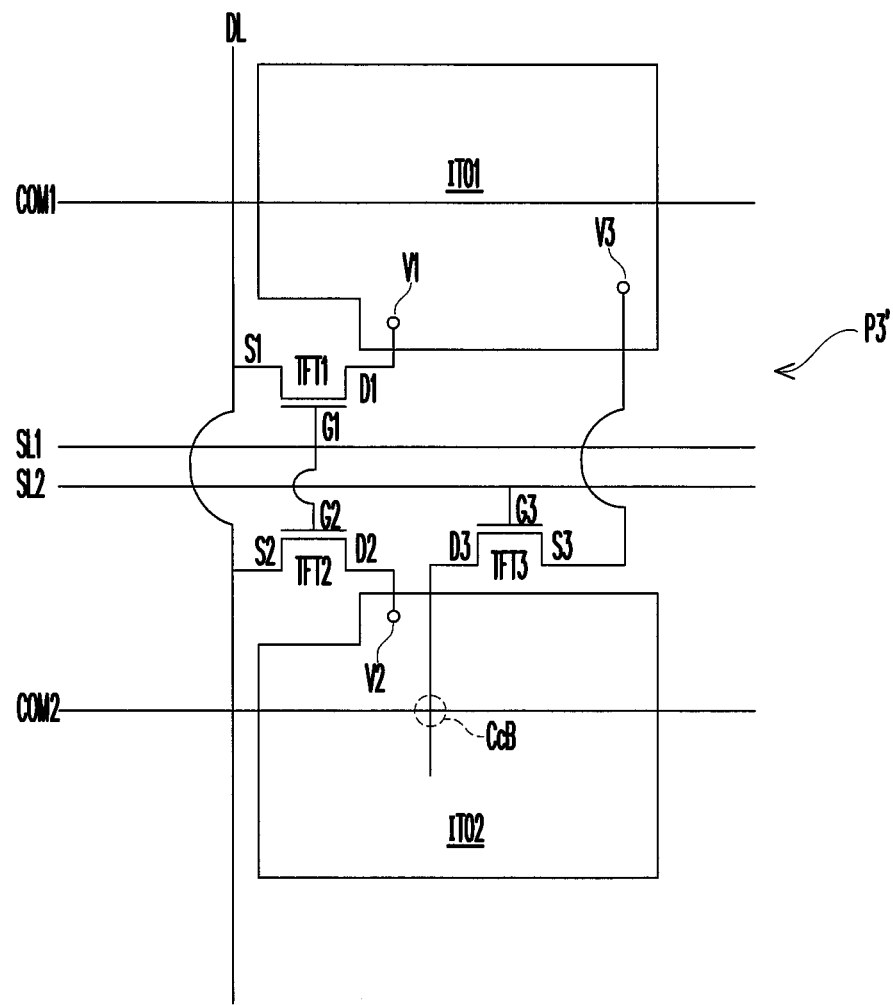
FIG. 9D is a diagram of another single sub-pixel.

FIG. 9A is an equivalent circuit diagram of a pixel array according to the second embodiment of the present invention, FIG. 9B is a diagram of a pixel array according to the second embodiment of the present invention, FIG. 9C is a diagram of a single sub-pixel in FIG. 9B, and FIG. 9D is a diagram of another single sub-pixel. Referring to FIG. 9A through FIG. 9C, the pixel array 300' of the present embodiment is similar with the pixel array 300 of the first embodiment except that the pixel array 300' of the present embodiment has no capacitor formed between the third drain D3 of the third thin film transistor TFT3 and the second pixel electrode ITO2. In other words, the first capacitor CcA mentioned in the pixel array 300 of the first embodiment is omitted in the pixel array 300' of the present embodiment.

In the sub-pixel P3' shown in FIG. 9D, the third source S3 of the third thin film transistor TFT3 is directly connected to the first pixel electrode ITO1. In other words, the first drain D1 of the first thin film transistor TFT1 and the third source S3 of the third thin film transistor TFT3 are electrically connected to the first pixel electrode ITO1 through the contact windows V1 and V3 respectively. Besides, the second drain D2 of the second thin film transistor TFT2 is electrically connected to the second pixel electrode ITO2 through the contact window V2. As shown in FIG. 9C and FIG. 9D, the sub-pixel P3 in FIG. 9C does not have the contact window V3. Thus, the sub-pixel P3 in FIG. 9C has higher aperture ratio.

Third Embodiment

Figure 2:
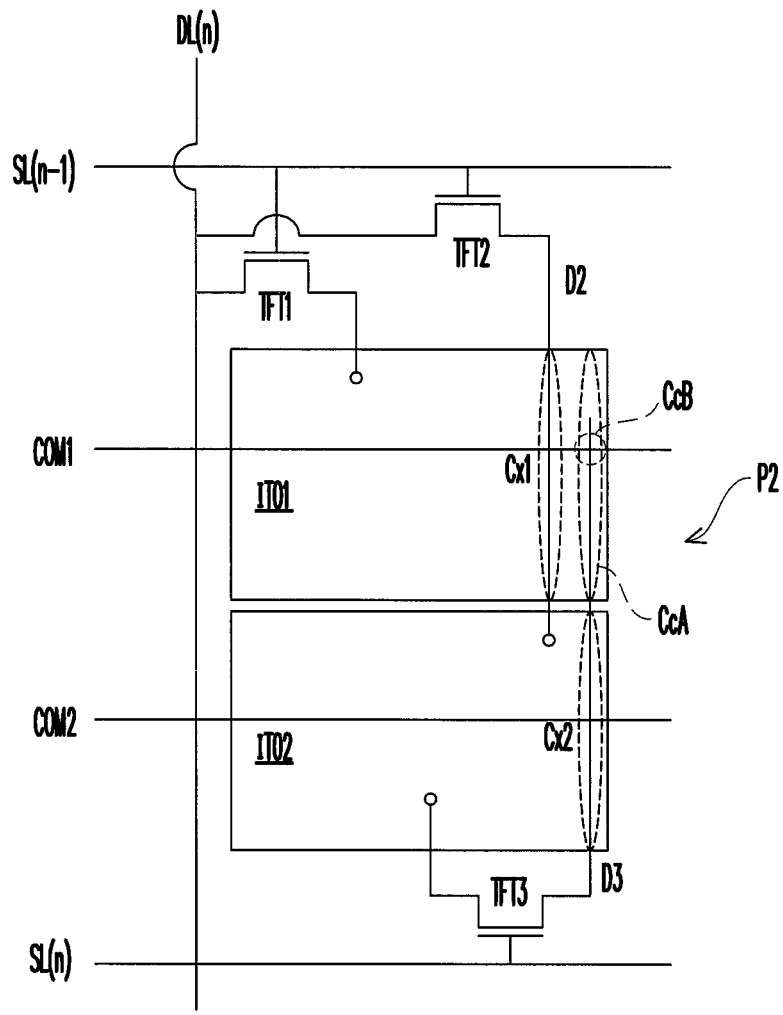
FIG. 2 is a diagram of a single sub-pixel in FIG. 1.
Figure 5A:
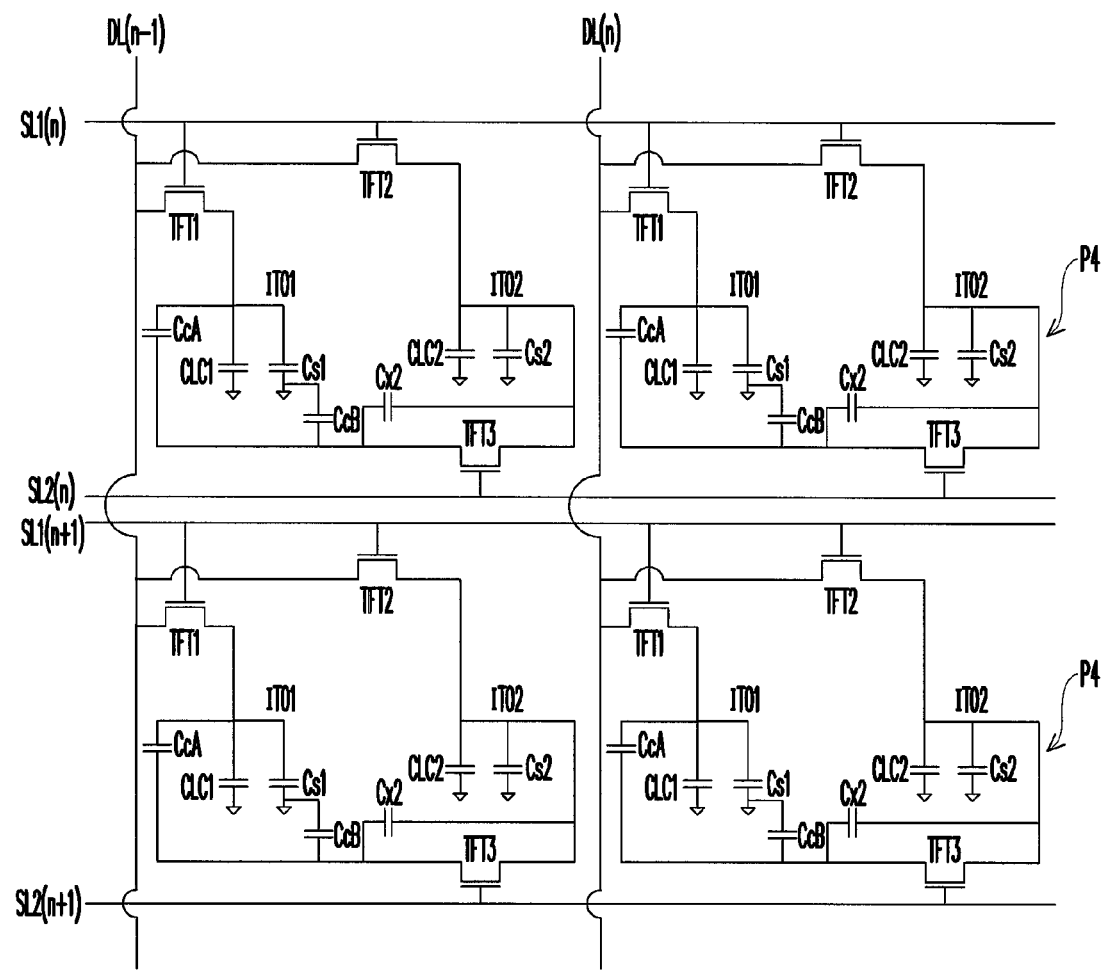
FIG. 5A is an equivalent circuit diagram of a pixel array according to a second embodiment of the present invention.
Figure 5B:
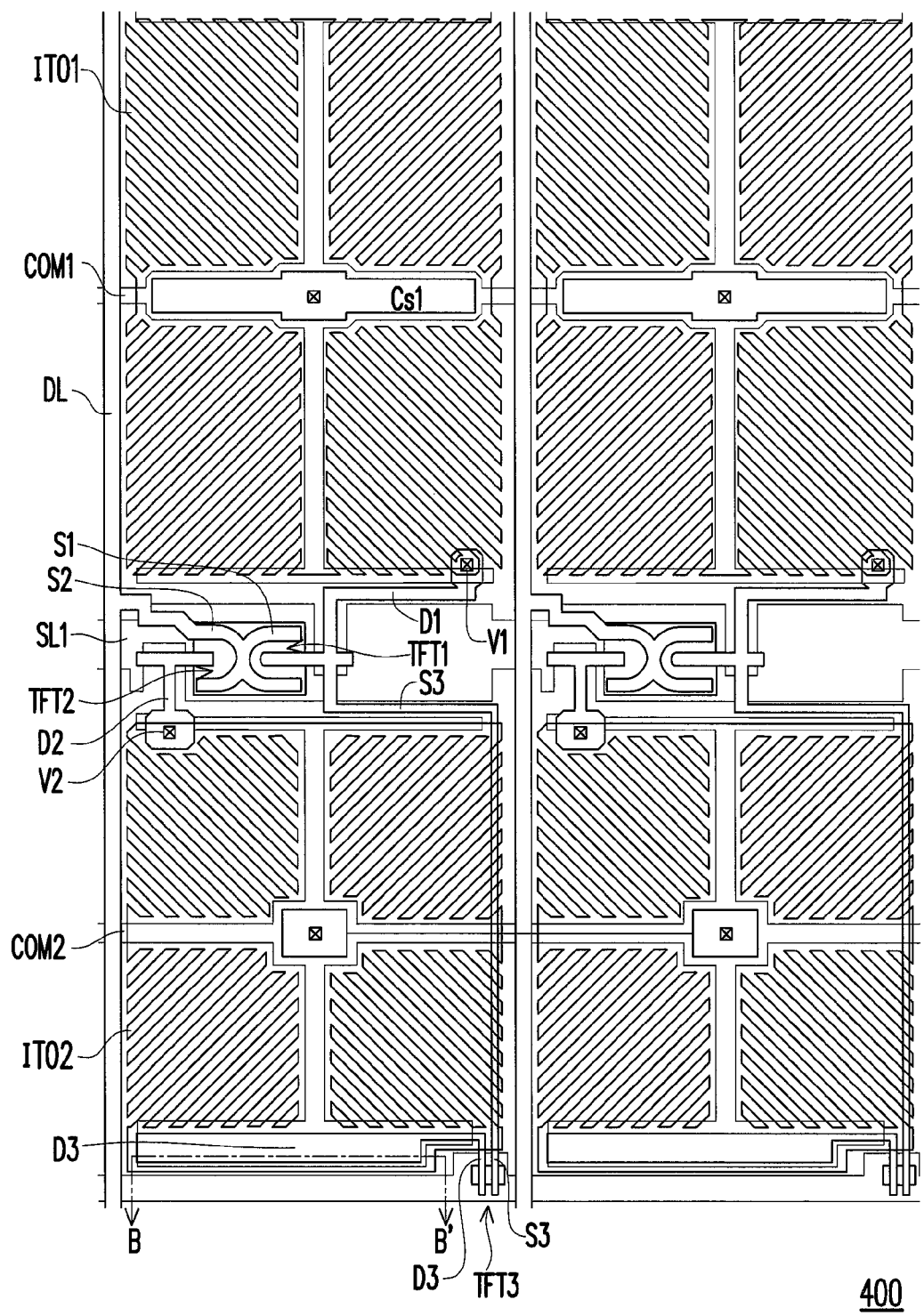
FIG. 5B is a diagram of a pixel array according to the second embodiment of the present invention.
Figure 5B:
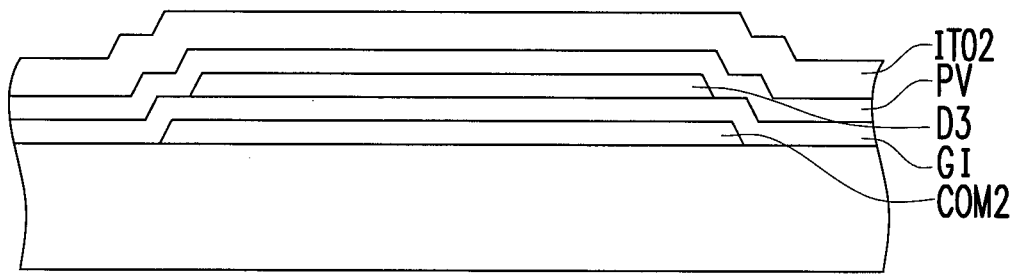
Figure 5C:
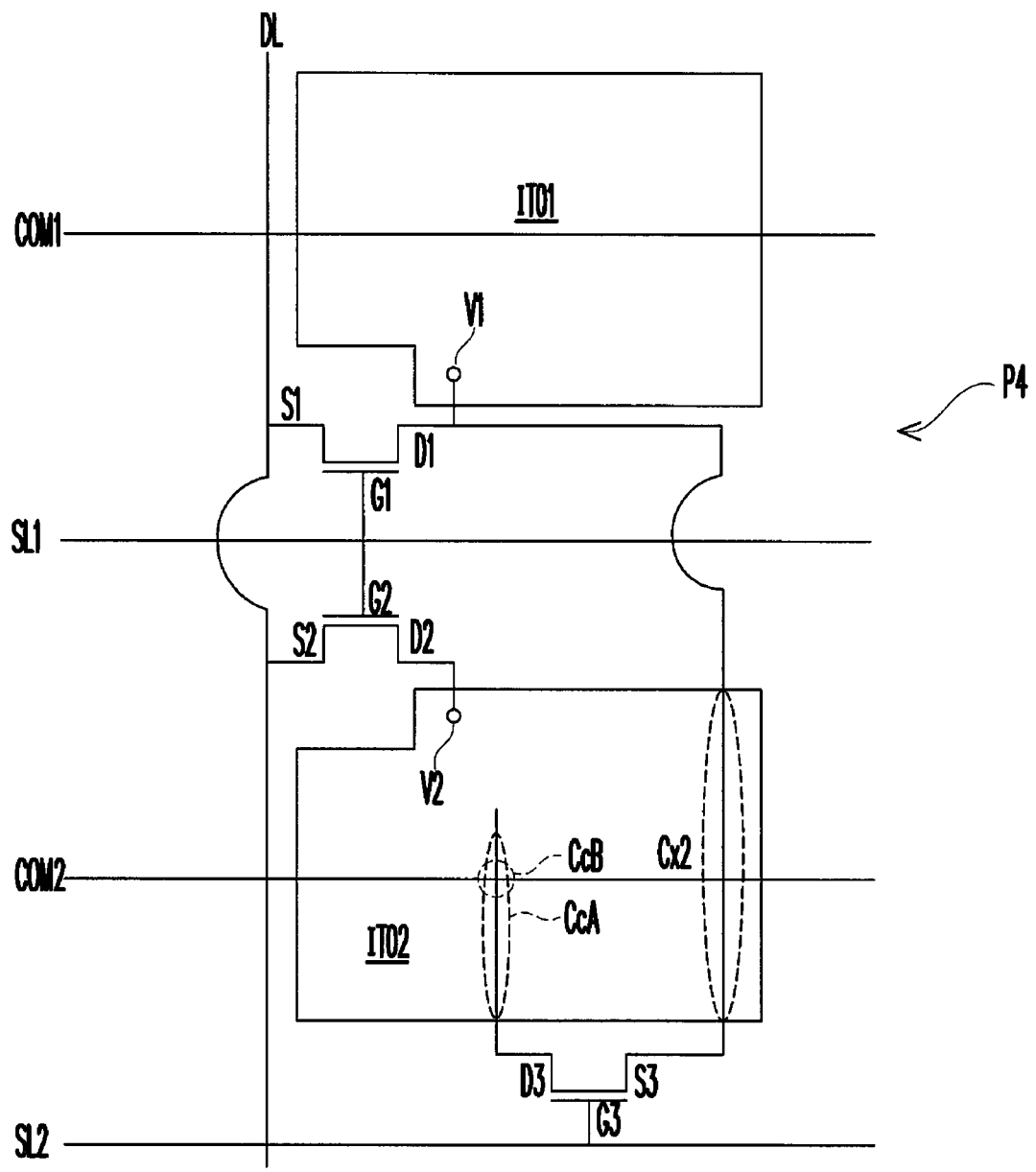
FIG. 5C and FIG. 5D are respectively diagrams of a single sub-pixel in FIG. 5B.
Figure 5D:
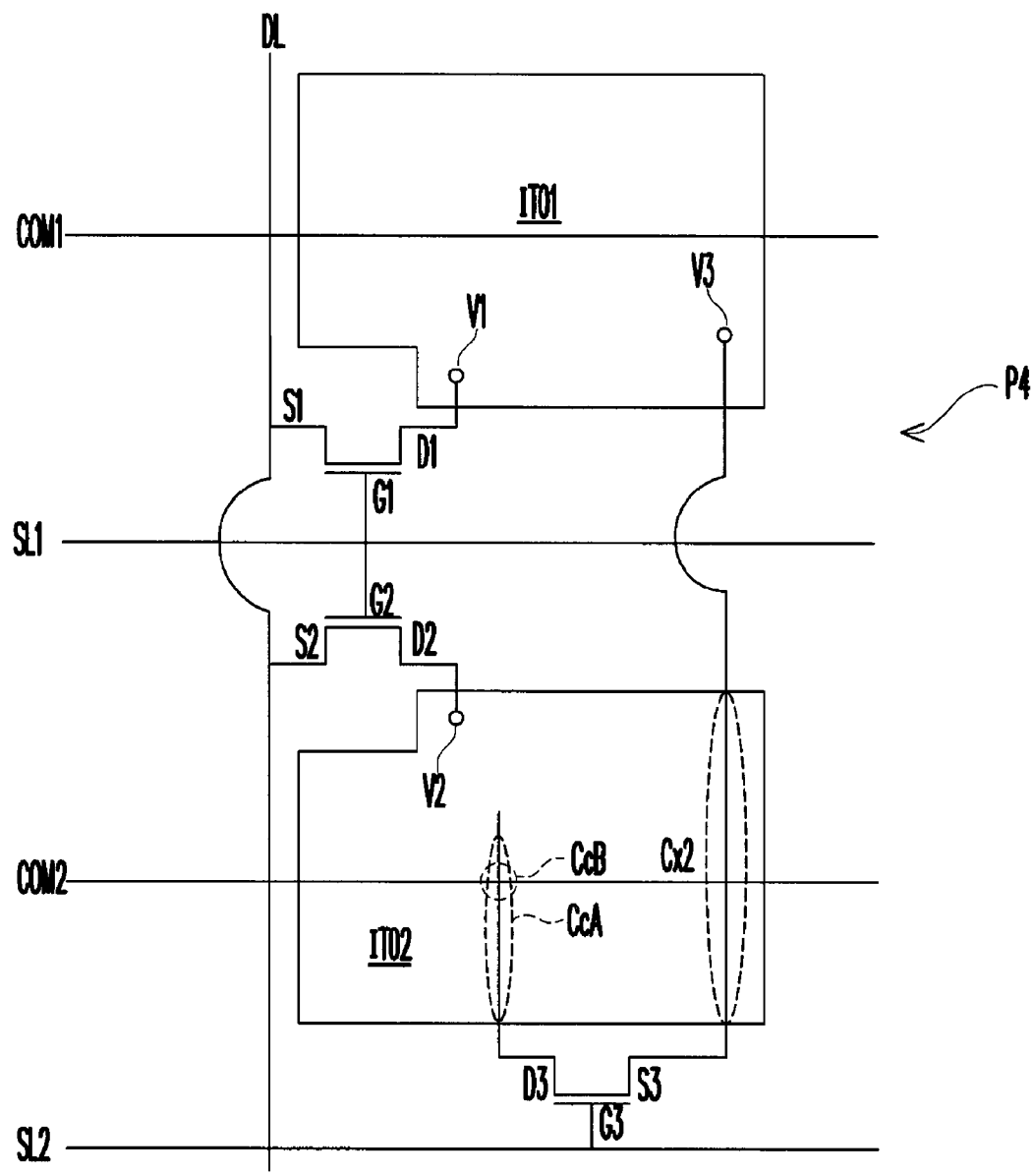

FIG. 5A is an equivalent circuit diagram of a pixel array according to the third embodiment of the present invention, FIG. 5B is a diagram of a pixel array according to the third embodiment of the present invention, FIG. 5B' is a cross-sectional view of the pixel array in FIG. 5B along line B-B', and FIG. 5C and FIG. 5D are respectively diagrams of a single sub-pixel in FIG. 5B. Referring to FIGS. 5A~5C, the pixel array 400 in the present embodiment is similar to the pixel array 300 in the first embodiment, and the major difference between the two embodiments is that in the pixel array 400, the second pixel electrode ITO2 in each of the sub-pixels P4 is located between the first scan line SL1 and the second scan line SL2. Specifically, the third source S3 of the third thin film transistor TFT3 extends across the second pixel electrode ITO2 and electrically connected to the first drain D1 directly (as shown in FIG. 5C). Accordingly, a parasitic capacitance Cx2 is generated between the third source S3 and the second pixel electrode ITO2. Compared to the conventional sub-pixel P2, even though there is the parasitic capacitance Cx2 in the sub-pixel P4, the sub-pixel P4 has only the parasitic capacitance Cx2 but not the parasitic capacitance Cx1 (as shown in FIG. 2). Thus, the sub-pixels in the present embodiment have less parasitic capacitance.

As described above, the sub-pixel P4 may also adopt the layout illustrated in FIG. 5D. To be specific, the first drain D1 of the first thin film transistor TFT1 and the third source S3 of the third thin film transistor TFT3 are electrically connected to the first pixel electrode ITO1 respectively through the contact windows V1 and V3.

Fourth Embodiment

Figure 10A:
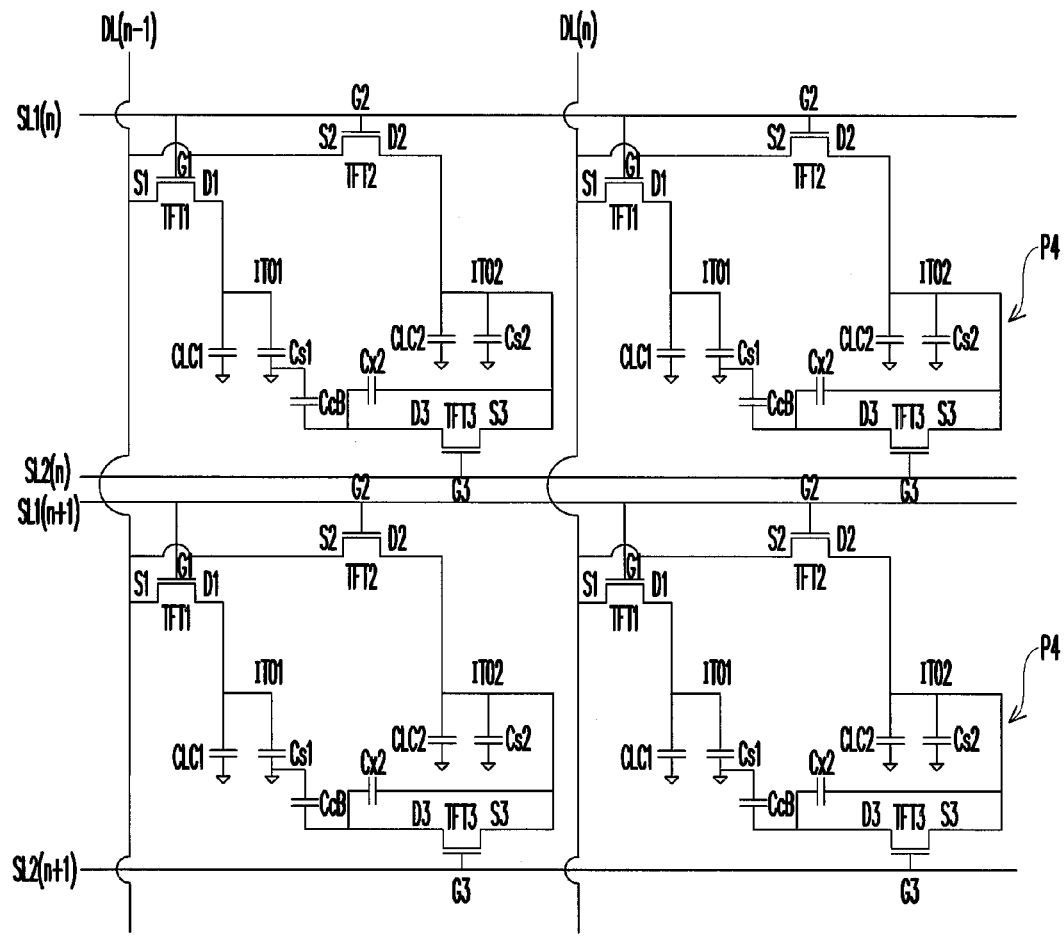
FIG. 10A is an equivalent circuit diagram of a pixel array according to the third embodiment of the present invention.
Figure 10B:
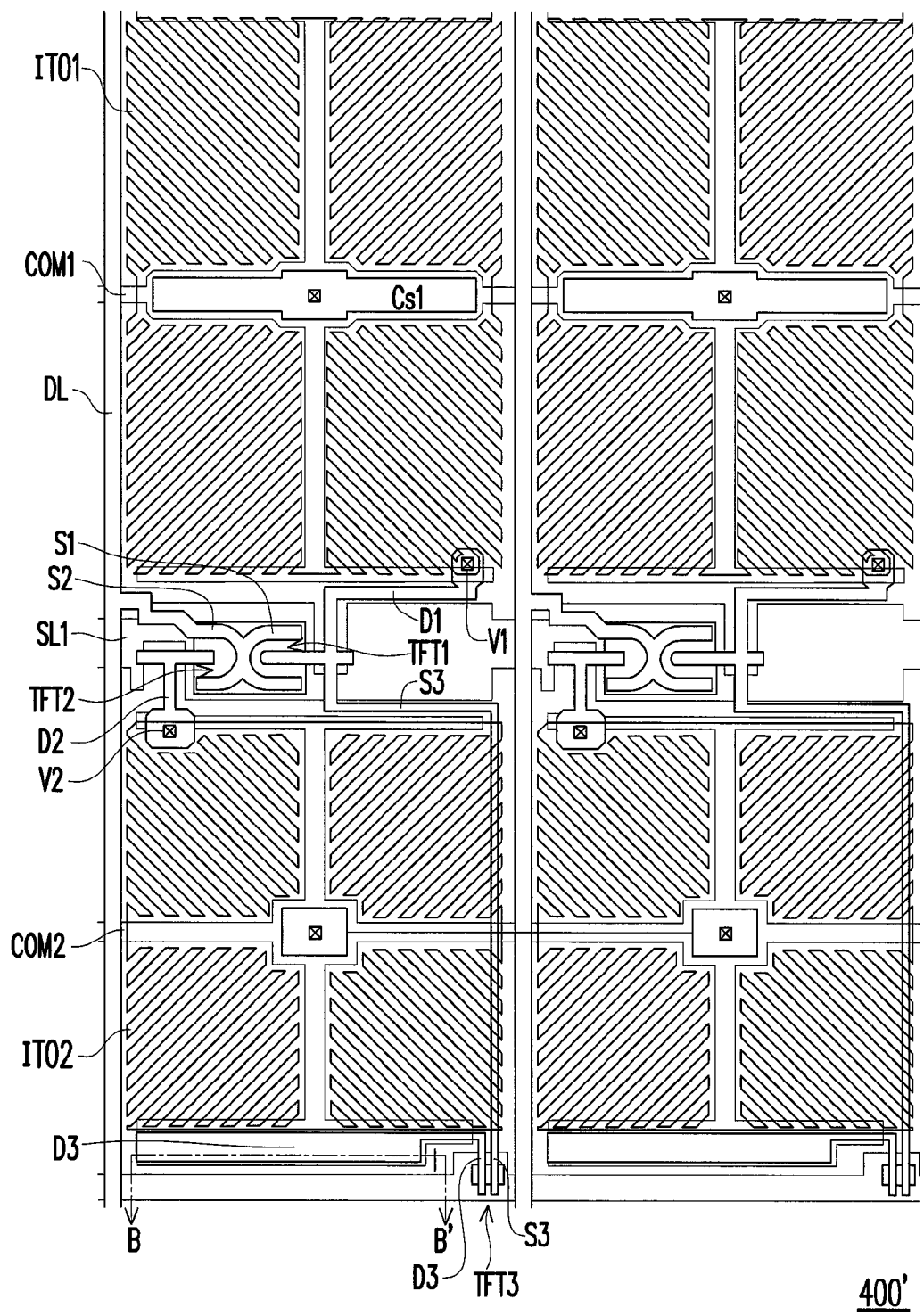
FIG. 10B is a diagram of a pixel array according to the third embodiment of the present invention.
Figure 10C:
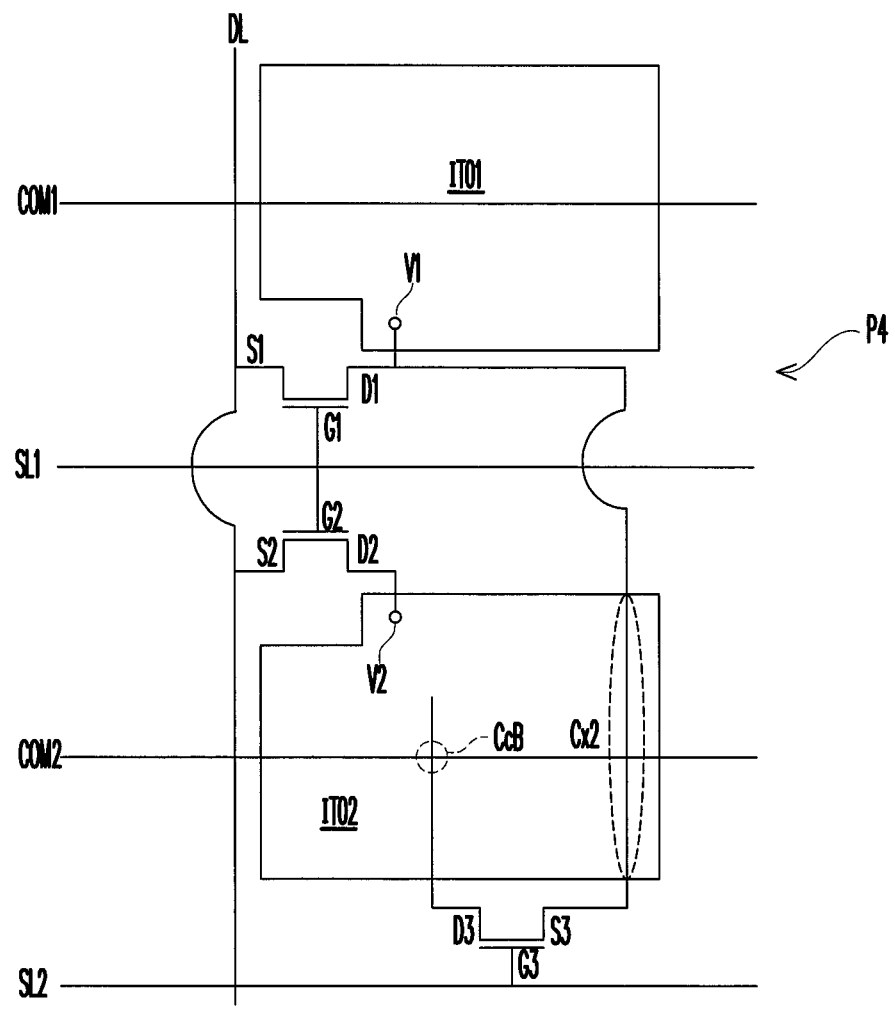
FIG. 10C and FIG. 10D are respectively diagrams of a single sub-pixel in FIG. 10B.
Figure 10D:
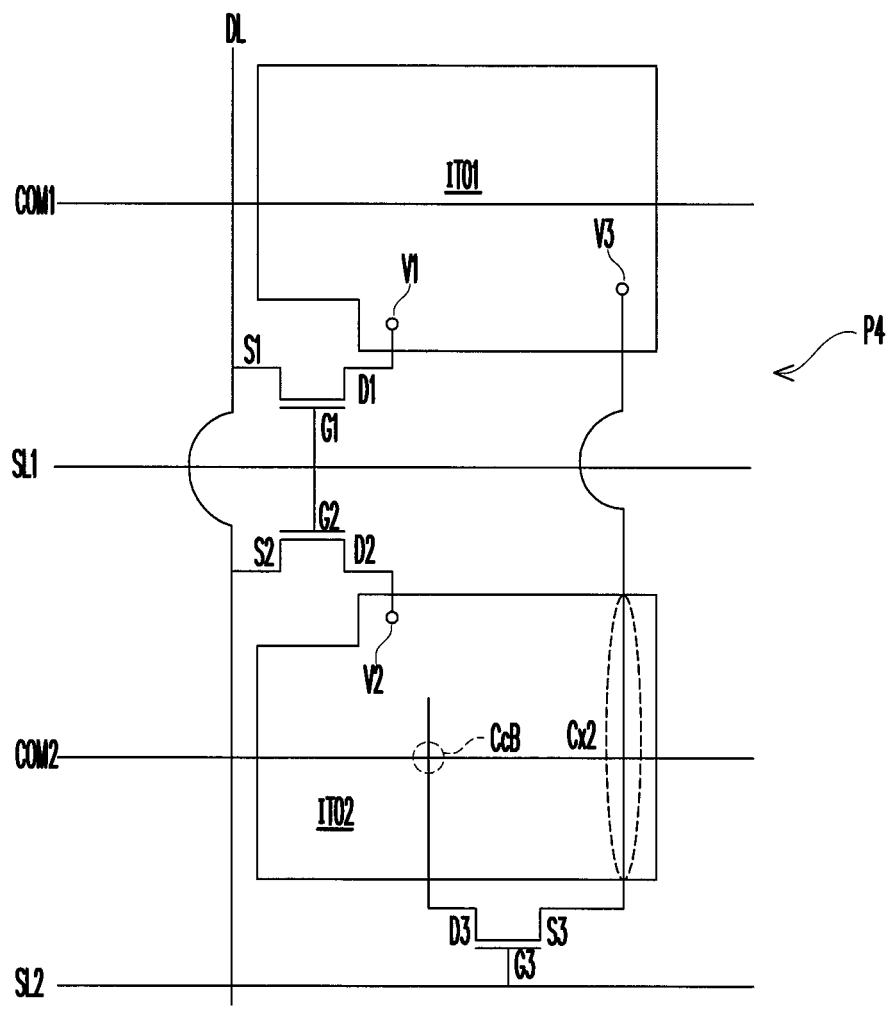

FIG. 10A is an equivalent circuit diagram of a pixel array according to the third embodiment of the present invention, FIG. 10B is a diagram of a pixel array according to the third embodiment of the present invention, and FIG. 10C and FIG. 10D are respectively diagrams of a single sub-pixel in FIG. 10B. Referring to FIG. 10A through FIG. 10D, the pixel array 400' of the present embodiment is similar with the pixel array 400 of the third embodiment except that the pixel array 400' has no capacitor formed between the third drain D3 of the third thin film transistor TFT3 and the second pixel electrode ITO2. In other words, the first capacitor CcA mentioned in the pixel array 400 of the first embodiment is omitted in the pixel array 400' of the present embodiment.

Figure 6:
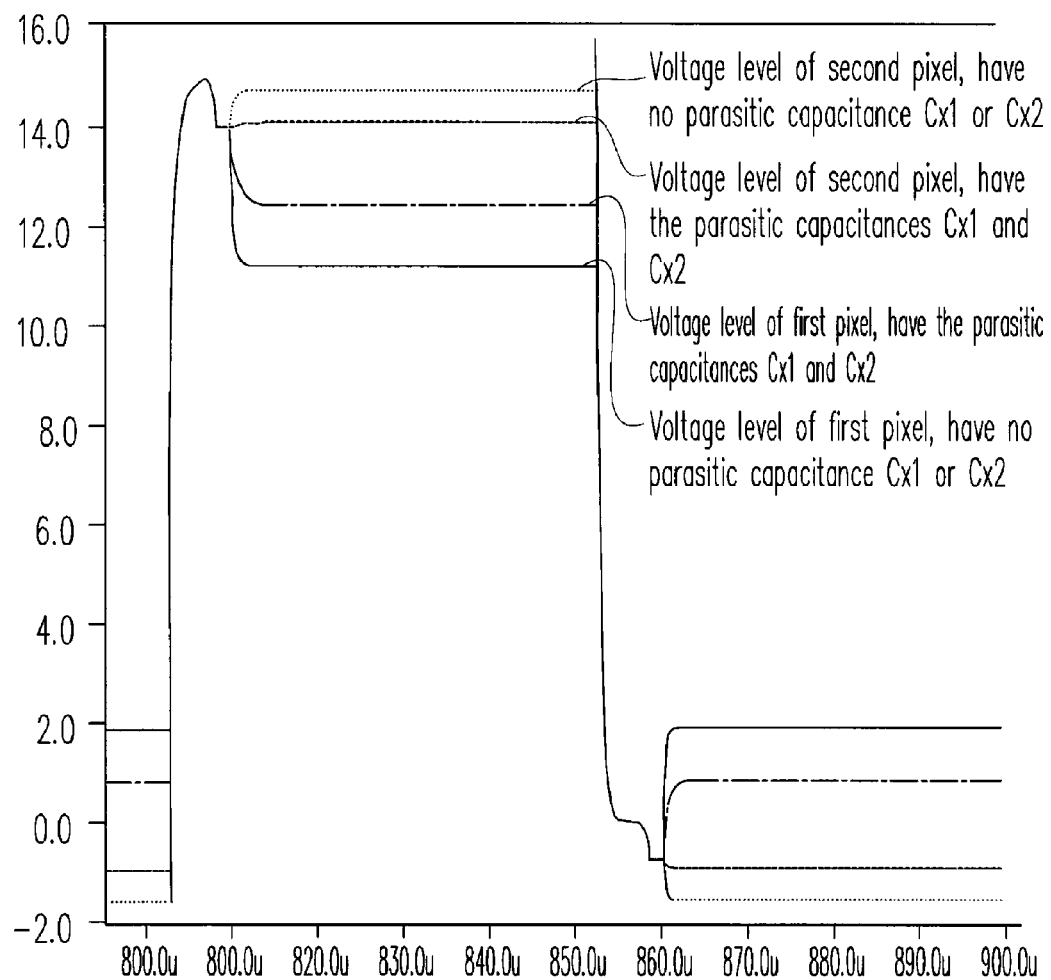
FIG. 6 is a diagram illustrating the voltage variations of a first pixel electrode and a second pixel electrode.

FIG. 6 is a diagram illustrating the voltage variations of a first pixel electrode and a second pixel electrode. Referring to FIG. 6, when the parasitic capacitances Cx1 and Cx2 exist, the voltage difference between the first pixel electrode and the second pixel electrode is restrained, and contrarily, when the parasitic capacitances Cx1 and Cx2 do not exist, the voltage difference between the first pixel electrode and the second pixel electrode is not restrained. Accordingly, the sub-pixels P3 and P4 in foregoing first and second embodiments can effectively resolve the problem of color washout.

Fifth Embodiment

Figure 7:
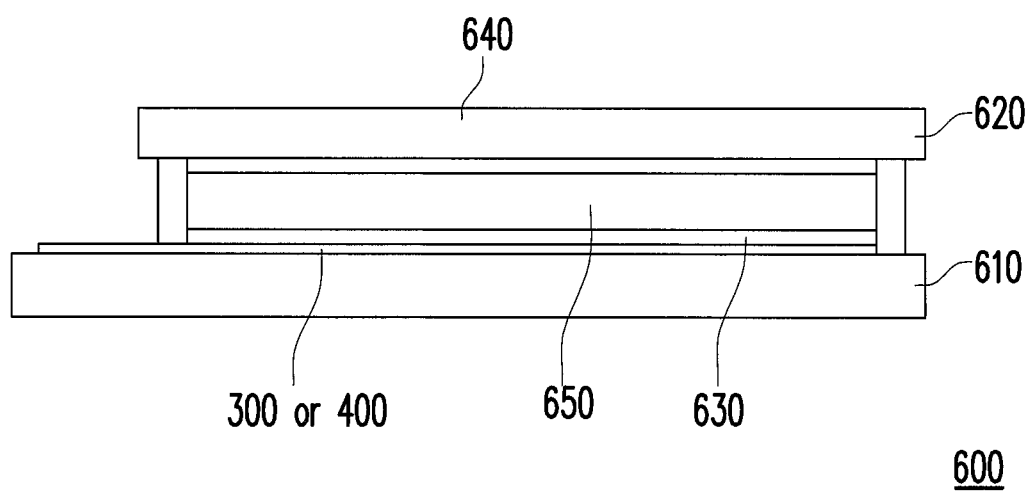
FIG. 7 is a diagram of a polymer stabilized alignment liquid crystal display (PSA-LCD) panel in the present invention.

FIG. 7 is a diagram of a polymer stabilized alignment liquid crystal display (PSA-LCD) panel in the present invention. Referring to FIG. 7, in the present embodiment, the PSA-LCD panel 600 includes a first substrate 610, a second substrate 620, two PSA layers 630 and 640, and a liquid crystal layer 650. The first substrate 610 has a pixel array (300, 300', 400 or 400') in the first, second, third or fourth embodiments described above, the second substrate 620 is disposed above the first substrate 610, and the two PSA layers 630 and 640 are respectively disposed on the first substrate 610 and the second substrate 620. Besides, the liquid crystal layer 650 is disposed between the two PSA layers 630 and 640. It should be noted that the liquid crystal layer 650 is made of a liquid crystal material containing monomers which can be polymerized by an energy source. When the energy source (for example, an ultraviolet ray) is supplied to the liquid crystal layer 650, the monomers are respectively polymerized on the surfaces of the first substrate 610 and the second substrate 620 to form the two PSA layers 630 and 640.

Figure 8:
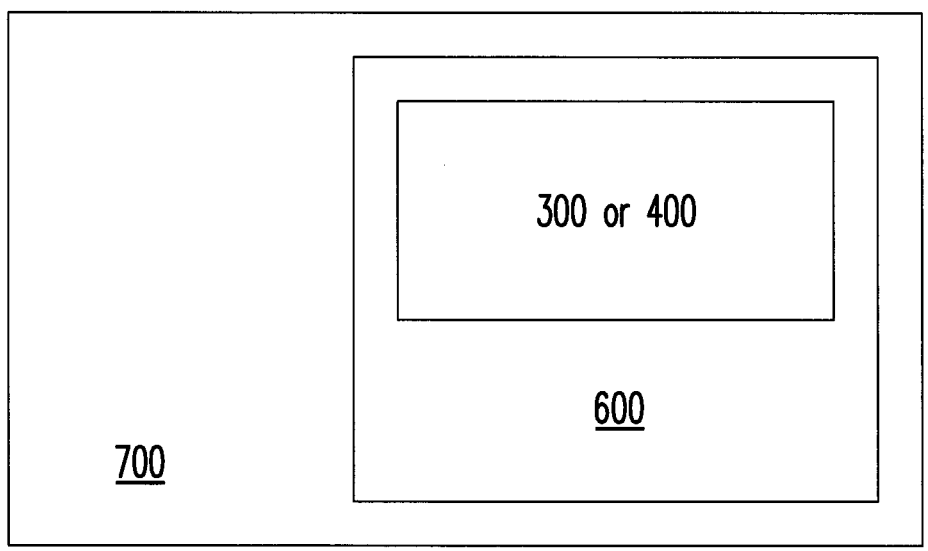
FIG. 8 is a diagram of an electro-optical apparatus in the present invention.

FIG. 8 is a diagram of an electro-optical apparatus in the present invention. Referring to FIG. 8, in the present embodiment, the electro-optical apparatus 700 includes a pixel array (300, 300', 400 or 400') in the first, second, third or fourth embodiments described above or the PSA-LCD panel 600 illustrated in FIG. 7. The electro-optical apparatus may be a portable product (for example, a cell phone, a video camera, a camera, a notebook computer, a game console, a watch, a music player, an email transceiver, a digital navigator, or a digital photo, etc), a video/audio product (for example, a video/audio player), a screen, a television set, a digital billboard, or a panel in a projector, etc.

As described above, in the present invention, the first scan line in each sub-pixel is disposed between the first pixel electrode and the second pixel electrode. Thereby, the pixel array in the present invention has lower parasitic capacitance and better display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel array, comprising:
   a plurality of first scan lines;
   a plurality of second scan lines, wherein each of the second scan lines is located between adjacent two of the first scan lines; and
   a plurality of data lines substantially intersected with the first scan lines and the second scan lines; and
   a plurality of sub-pixels, wherein each of the sub-pixels is electrically connected to one of the first scan lines, one of the second scan lines, and one of the data lines, and each of the sub-pixels comprises:
   a first switch;
   a second switch, the first switch and the second switch being electrically connected to the same first scan line and the same data line;
   a first pixel electrode electrically connected to the first switch;
   a second pixel electrode electrically connected to the second switch, one of the first scan lines being located between the first pixel electrode and the second pixel electrode;
   a plurality of common lines electrically connected with each other, the common lines being disposed under the first pixel electrode and the second pixel electrode; and
   a third switch electrically connected to the first pixel electrode and one of the second scan lines, wherein the third switch has a floating terminal, and the floating terminal is capacitively coupled to the common line under the second pixel electrode to form a capacitor.

2. The pixel array according to claim 1, wherein an extension direction of the first scan lines is substantially parallel to an extension direction of the second scan lines.

3. The pixel array according to claim 1, wherein the sub-pixels are arranged into a plurality of rows, and the sub-pixels in the same row are electrically connected to the same first scan line and the same second scan line.

4. The pixel array according to claim 3, wherein the first scan line and the second scan line electrically connected to the sub-pixels in the same row are electrically insulated from each other.

5. The pixel array according to claim 1, wherein the sub-pixels are arranged into a plurality of rows, and the second scan line electrically connected to the sub-pixels in the $n^{th}$ row and the first scan line electrically connected to the sub-pixels in the $(n+1)^{th}$ row are electrically connected to each other, wherein n is a positive integer.

6. The pixel array according to claim 1, wherein the second scan line is located between the first pixel electrode and the second pixel electrode.

7. The pixel array according to claim 1, wherein the second pixel electrode is located between the first scan line and the second scan line.

8. The pixel array according to claim 1, wherein each of the first switches comprises a first thin film transistor, and the first thin film transistor has a first gate electrically connected to one of the first scan lines, a first source electrically connected to one of the data lines, and a first drain electrically connected to the first pixel electrode.

9. The pixel array according to claim 1, wherein each of the second switches comprises a second thin film transistor, and the second thin film transistor has a second gate electrically connected to one of the first scan lines, a second source electrically connected to one of the data lines, and a second drain electrically connected to the second pixel electrode.

10. The pixel array according to claim 1, wherein each of the third switches comprises a third thin film transistor, and the third thin film transistor has a third gate electrically connected to one of the second scan lines, a third source electrically connected to the first pixel electrode, and the floating terminal.

11. The pixel array according to claim 10, wherein the third source is directly connected to the first pixel electrode.

12. The pixel array according to claim 10, wherein the third source is directly connected to the first drain, and the third source is electrically connected to the first pixel electrode through the first drain.

13. The pixel array according to claim 1, wherein the floating terminal is located under the second pixel electrode.

14. The pixel array according to claim 1, wherein a line width of each of the first scan lines is substantially greater than a line width of each of the second scan lines located in the same sub-pixel.

15. A polymer stabilized alignment liquid crystal display (PSA-LCD) panel, comprising:
   a first substrate having a pixel array of claim 1;
   a second substrate disposed above the first substrate;
   two polymer stabilized alignment layers respectively disposed on the first substrate and the second substrate; and
   a liquid crystal layer disposed between the polymer stabilized alignment layers.

16. An electro-optical apparatus, comprising the pixel array of claim 1.

* * * * *